United States Patent
Zhou et al.

(10) Patent No.: US 10,410,144 B2
(45) Date of Patent: Sep. 10, 2019

(54) SYSTEM AND METHOD FOR PARALLEL EDGE PARTITIONING IN AND/OR GRAPH SEARCH

(75) Inventors: Rong Zhou, San Jose, CA (US); Minh Binh Do, Palo Alto, CA (US); Tim C. Schmidt, Campbell, CA (US); Serdar Uckun, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 157 days.

(21) Appl. No.: 13/273,714

(22) Filed: Oct. 14, 2011

(65) Prior Publication Data

US 2013/0097199 A1  Apr. 18, 2013

(51) Int. Cl.
G06Q 10/04 (2012.01)

(52) U.S. Cl.
CPC .................................. G06Q 10/04 (2013.01)

(58) Field of Classification Search
CPC ........... G06F 17/30958; G06F 17/5045; G06F 17/30876; G06Q 10/04
USPC .......................................... 707/758; 370/255
See application file for complete search history.

(56) References Cited

U.S. PATENT DOCUMENTS

| | | | | |
|---|---|---|---|---|
| 5,535,145 | A * | 7/1996 | Hathaway | 703/2 |
| 6,556,984 | B1 * | 4/2003 | Zien | G06F 17/30876 |
| 7,805,454 | B2 * | 9/2010 | Zhou | 707/758 |
| 2007/0047470 | A1 * | 3/2007 | Okabe | 370/255 |

OTHER PUBLICATIONS

"Lao*: A heuristic search algorithm that finds solutions with loops" by Eric A. Hansen and Shlomo Zilberstein; Artificial Intelligence 129 (2001) 35-62.*
"Heuristic Search in Cyclic and/or Graphs" by Eric A. Hansen and Shlomo Zilberstein; AAAI-98 Proceedings, 1998.*
"And/Or Graph Representation of Assembly Plans" by Luiz S. Homem De Mello, and Arthur C. Sanderson; IEEE Transactions on Robotics and Automation, vol. 6 No. 2; Apr. 1990.*

(Continued)

*Primary Examiner* — Boris Gorney
*Assistant Examiner* — Christy Y Kim
(74) *Attorney, Agent, or Firm* — Fay Sharpe LLP

(57) ABSTRACT

A method and system for searching a graph in parallel which constructs an abstract representation of an AND/OR graph using state-space abstraction. The abstract representation of the graph includes one or more abstract nodes having duplicate detection scopes and one or more abstract edges having operator groups adjusted for AND node outcomes. The duplicate detection scopes of the abstract nodes are partitioned into smaller duplicate detection scopes using edge partitioning, wherein the abstract edges are used to define the smaller duplicate detection scopes. Nodes in the current search layer are expanded by a processing unit using the adjusted operator groups of outgoing abstract edges of the abstract nodes mapped into by the nodes, wherein the nodes expanded in parallel use adjusted operator groups associated with abstract edges having disjoint duplicate detection scopes. The method progresses to the next search layer once all the adjusted operator groups in the current search layer have been used for node expansions.

19 Claims, 12 Drawing Sheets

(56) References Cited

OTHER PUBLICATIONS

U.S. Appl. No. 12/842,363, filed Jul. 23, 2010 for "System and Method for Parallel Graph Searching Utilizing Parallel Edge Partitioning".
Hoffmann, et al. "SAP Speaks PDDL", 2010, Proc. of the 24th AAAI Conference on Artificial Intelligence (AAAI-10), pp. 1096-1099.
Otten, et al. "Towards Parallel Search for Optimization in Graphical Models", 2010, Proc. of ISAIM, pp. 1-8.

* cited by examiner

| PROBLEM | TIME (SECONDS) | GENERATED NODES |
|---|---|---|
| p-14 | 45.01 | 159459 |
| p-125 | 32.49 | 115317 |
| p-137 | 24.15 | 110861 |
| p-291 | 13.55 | 47881 |
| p-303 | 11.96 | 42601 |

PERFORMANCE RESULTS FOR SEQUENTIAL AO* ON BPM PLANNING PROBLEMS

FIG. 9

| PROBLEM | 1 THREAD | 2 THREADS | 4 THREADS | 8 THREADS |
|---|---|---|---|---|
| p-14 | 53.65 | 53.59 | 53.62 | MEM |
| p-125 | 39.02 | 38.91 | 38.93 | 40.48 |
| p-137 | 28.53 | 28.54 | 28.62 | 29.69 |
| p-291 | 16.2 | 16.24 | 16.23 | 16.79 |
| p-303 | 14.52 | 14.52 | 14.49 | 14.95 |

WALL-CLOCK SECONDS FOR PAO* IN SOLVING BPM PLANNING PROBLEMS WITH 1, 2, 4, AND 8 THREADS

FIG. 10

| PROBLEM | 1 THREAD | 2 THREADS | 4 THREADS | 8 THREADS |
|---|---|---|---|---|
| p-14 | 55.93 | 27.38 | 13.66 | 7.09 |
| p-125 | 40.3 | 19.72 | 9.83 | 5.06 |
| p-137 | 30.09 | 14.58 | 7.26 | 3.79 |
| p-291 | 16.57 | 8.1 | 4.05 | 2.09 |
| p-303 | 14.76 | 7.3 | 3.6 | 1.86 |

WALL-CLOCK SECONDS FOR PEP-AO* IN SOLVING BPM PLANNING PROBLEMS WITH 1, 2, 4, AND 8 THREADS

FIG. 11

PARALLEL SPEED UP COMPARISON OF SEQUENTIAL AO*, PAO*, PEP-AO*, AND A THEORETICALLY OPTIMAL ALGORITHM WITH A PERFECT SPEEDUP FOR PROBLEM p-137

SYSTEM AND METHOD FOR PARALLEL EDGE PARTITIONING IN AND/OR GRAPH SEARCH

BACKGROUND

This application is directed to graph searching in the planning area, and more particularly planning in non-deterministic environments, which arise in many real-world applications, including business process management (BPM).

Graph searching accounts for much of the heavy-lifting in many areas of high performance computing and artificial intelligence (AI), such as planning, scheduling, combinatorial optimization, and model checking. This is because these tasks generally include searching graphs having exponential size in the depth of the search. Thus, finding an optimal or even approximate solution can take a long time, and the ability to scale up to larger problems is to a large degree dependent on the speed of the underlying graph-search algorithm.

Different planning categories exist in the planning area including classical planning and non-deterministic planning. Classical planning generates a linear sequence of actions which move towards a final goal. Non-deterministic planning differs from classical planning in that a single action can result in one of many outcomes that are beyond the control of the decision maker. As a result, the solution to a nondeterministic planning problem (i.e., a plan) is no longer a linear sequence of actions but rather it takes the form of a tree or a graph. Correspondingly, the search space of a non-deterministic planning problem must be enriched with new types of search nodes called AND nodes that correspond to multiple outcomes which all need to be reasoned about, in addition to the OR nodes (corresponding to agent's options) that are commonly found in the search space of classical planning problems.

Graphs are used to represent problems and are employed to find solutions to problems, wherein finding a path through a graph represents a solution to a represented problem. A variety of different graph search techniques exist to find a solution or path depending on the type of problem or type of graph used to represent the problem. Historically, graphs focused on the best solution or shortest path in a graph, wherein a value of a solution or path through the graph is defined by costs to obtain the solution or path. The costs of various potential solutions or paths may then be compared to select a specific solution or path. Costs are estimated initially and, with an admissible cost estimator, are never overestimated, but can be updated as the graph is expanded and more information becomes available.

FIG. 1 shows an example of an AND/OR search graph 100 with two actions $a_1$ and $a_2$. The start state of the search graph is an OR node with two outgoing arcs that correspond to actions $a_1$ and $a_2$ for which the planner can choose one of them. Each arc from the start state leads to an AND node with two successor OR nodes, one for each possible outcome state. By convention, a square denotes an OR node (or a choice node) and a circle denotes an AND node (or a chance node) resulted from the nondeterministic outcomes of $a_1$ or $a_2$. A full contingency plan must specify the action to take under all possible outcomes or contingencies as a result of executing the plan. A k-connector connects a state to a set of k successor states, one for each possible immediate outcome. A solution to an AND/OR search problem takes the form of an acyclic graph called the solution graph with the following properties:

The start state is part of the solution graph
For any non-goal state, only one outgoing k-connector is part of the solution graph and each of its successor states is also part of the solution graph If every path in the solution graph eventually ends at a goal state, then the plan is called a strong plan. If some but not all paths terminate at a goal state, the plan is called a weak plan. A strong plan guarantees that the goal state is reached no matter what happens; whereas a weak plan does not. Whether a planning problem admits a strong or weak plan depends on (a) the set of operators that transform one state into another, (b) the starting state, and (c) the goal state. While strong plans are generally preferred over weak plans, there are exceptions in applications such as business process management (BPM), in which shorter weak plans can sometimes be more desirable than strong plans that are much longer.

As problems and graphs have become more complex, parallelism has been added to reduce the time to solve a problem. Computer applications operating on electronic computing devices use graphs by constructing a graph representing a problem, and then employ an algorithm to search the graph for a solution. Typically these are done simultaneously. Node expansion dynamically constructs a graph with some initial starting state. Searching the graph is done as the graph is constructed in order to find a solution, but such searching must consider whether there are cycles or redundancies in the graph.

AND/OR graph search problems can be solved by the AO* algorithm, which constructs an explicit search graph that initially consists of the start state and is gradually expanded by the following algorithmic steps:

1. Find the best non-goal leaf node by following the best action at each OR node until a non-goal leaf node is reached.
2. Expand the best non-goal leaf node by generating its successors and adding any new successor states to the explicit search graph. For each new state s, set $f(s)=h(s)$ where $h(s)$ is an admissible heuristic that never overestimates the cost of reaching a goal state from s.
3. Recursively update the cost function (f-cost) of the ancestor nodes of the just-expanded state until the start state is reached and mark the best action for each ancestor state encountered along the way. To update the f-cost of a state s, set $f(s)=\min_{s'}[c(s, s')+f(s')]$ where s' is a successor state of s and $c(s, s')$ is the cost of going from state s to state s'. The action that takes s to its best successor, $\operatorname{argmin}_s[c(s, s')+f(s')]$, is marked as the best action for state s (where $\operatorname{argmin}_s$ stands for the arguments of the minimum).

AO* repeats the above steps until all leaf nodes reachable by following the best actions are all goal nodes. More precisely, the termination condition of AO* is defined as follows:

a. An OR node is solved if it is a goal node, or one of its children is solved; otherwise it is failed.
b. An AND node is solved if all of its children are solved; otherwise it is failed.
c. AO* terminates when the start state is solved or failed.

A variant of the AO* algorithm attempts to address weak plans (i.e., plans that are not guaranteed to reach a goal node under all circumstances) by modifying the definition of step b in the AO* termination condition as follows:

b'. An AND node is solved if all of its children are either solved or failed, and at least one child is solved; otherwise it is failed.

The above definition of b' seeks to accommodate weak plans for BPM in AO* search, where strong plans are either infeasible or too expensive to compute or execute. In BPM planning, the response time is of importance, as the planner must interact with the business user in real time or semi real-time (subject to human patience). Thus, fast planning is deemed as a major requirement for automated planning to be practical in BPM. However, since the speed of a single processor core is not expected to improve dramatically over time, efficient parallelization of AO* and its variants on multiple cores or computers is the only way to significantly improve their speed.

Keeping track of all possible action outcomes in a non-deterministic environment can lead to a combinatorial explosion of the search space. Therefore, a parallel AO* (or PAO*) search technique has been developed to increase the speed of finding a solution through parallelism. This technique uses a master-worker scheme where a master assigns work to workers which work in parallel. Specifically:

1. The master process searches from the root node in a sequential manner until the explicit search graph constructed is sufficiently large.
2. The master process divides up the parallelization frontier, which represents the fringe of the explicit search graph, and distributes them as sub-problems to workers for concurrent solving.
3. Workers solve their assigned sub-problems in parallel using sequential AO* and transmit the optimal sub-problem solution back to the master process.
4. The master process combines the solutions from all the workers to obtain the overall solution.

The difficulty with this technique when trying to be put into practice includes the determination of when the explicit search graph is sufficiently large and building of the graph may be stopped (Step 1) and sub-problems may start to be distributed to workers (Step 2). Another issue is if there are redundant parts of the search space that multiple workers may visit how to coordinate search efforts to minimize repeated work between workers.

As to the first issue, there is a trade-off between the size of the initial search graph and the size of the sub-problems: if the parallelization frontier is too small, it will result in only a few sub-problems that are too complex for the workers to solve quickly. On the other hand, an overly large parallelization frontier will lead to many small and sometimes trivial sub-problems to be generated and passed on to the workers, which will add significant communication overhead to defeat any parallel speedup achieved at the individual worker level. With regard to the second issue, sparse inter-worker communication is usually preferred, but the price paid is an increased amount of redundant search due to a lack of timely communication. Such an increase is in worst case exponential in the depth of search, which usually wipes out any parallel speedup gains, since at best the number of processor cores or machines are only a polynomial resource in most practical settings.

INCORPORATION BY REFERENCE

The following patents/applications and articles are each incorporated herein in there entireties:

U.S. patent application Ser. No. 12/842,363 for "System and Method for Parallel Graph Searching Utilizing Parallel Edge Partitioning" by Rong Zhou, filed Jul. 23, 2010.

U.S. Pat. No. 7,805,454 for "System and Method for Parallel Graph Search Utilizing Parallel Structured Duplicate Detection" by Rong Zhou, issued Sep. 28, 2010.

BRIEF DESCRIPTION

A method and system for searching a graph in parallel which constructs an abstract representation of an AND/OR graph using state-space abstraction. The abstract representation of the graph includes one or more abstract nodes having duplicate detection scopes and one or more abstract edges having operator groups adjusted for AND node outcomes. The duplicate detection scopes of the abstract nodes are partitioned into smaller duplicate detection scopes using edge partitioning, wherein the abstract edges are used to define the smaller duplicate detection scopes. Nodes in the current search layer are expanded by a processing unit using the adjusted operator groups of outgoing abstract edges of the abstract nodes mapped into by the nodes, wherein the nodes expanded in parallel use adjusted operator groups associated with abstract edges having disjoint duplicate detection scopes. The method progresses to the next search layer once all the adjusted operator groups in the current search layer have been used for node expansions.

BRIEF DESCRIPTION OF THE DRAWINGS

FIG. 9 shows a table of performance results for AO* solving BPM problems;
FIG. 10 shows a table of performance results for PAO* solving BPM problems;
FIG. 11 shows a table of performance results for PEP-AO* solving BPM problems.

DETAILED DESCRIPTION

Figure 1:
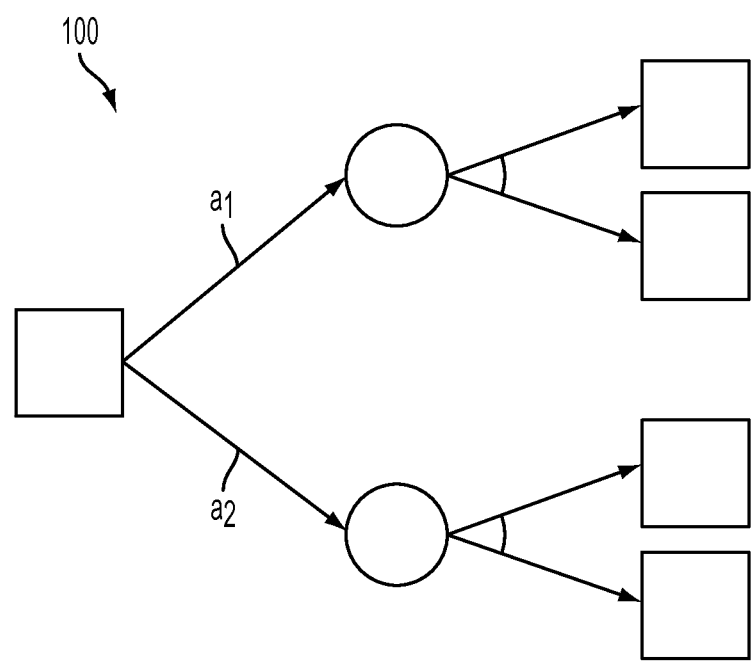
FIG. 1 is an example AND/OR graph.

The following disclosure describes an efficient technique for parallelizing AND/OR graph searching as it relates to planning for non-deterministic problems (see graph 100 of FIG. 1). The to-be-described technique, called herein PEP-AO*, is based on extending Parallel Edge Partitioning (PEP), an advanced graph search algorithm, for use with AO* algorithms in the solving of non-deterministic problems, as described for example in AND/OR graphs.

While existing PEP implementations addressed a certain set of problems, these implementations were only applicable to OR graphs. PEP uses both state-space abstraction, operator-space abstraction, and provides immediate duplicate detection, and low synchronization overhead. PEP subdivides the duplicate-detection scope of a node (or a set of nodes that map to the same abstract state) into multiple partitions, one for each abstract edge that connects an abstract state to one of its successors in an abstract graph. The duplicate-detection scope of an abstract edge is defined as the set of nodes that map to the destination of the abstract edge. Each abstract edge is associated with an operator group, which contains a set of operators from the original search problem that are: (1) applicable to nodes that map to the source of the abstract edge; and (2) the successor nodes generated by applying these operators all mapped to the same abstract state that is the destination of the abstract edge. If only one operator group is used at a time to generate successors for nodes that map to the source of an abstract edge, the duplicate-detection scope can be further reduced to a single abstract state, and the nodes mapped to that single abstract state. Because choosing which operator group to use is under the control of the search algorithm, PEP can be applied even when the underlying search graph has no locality at all.

Figure 2:
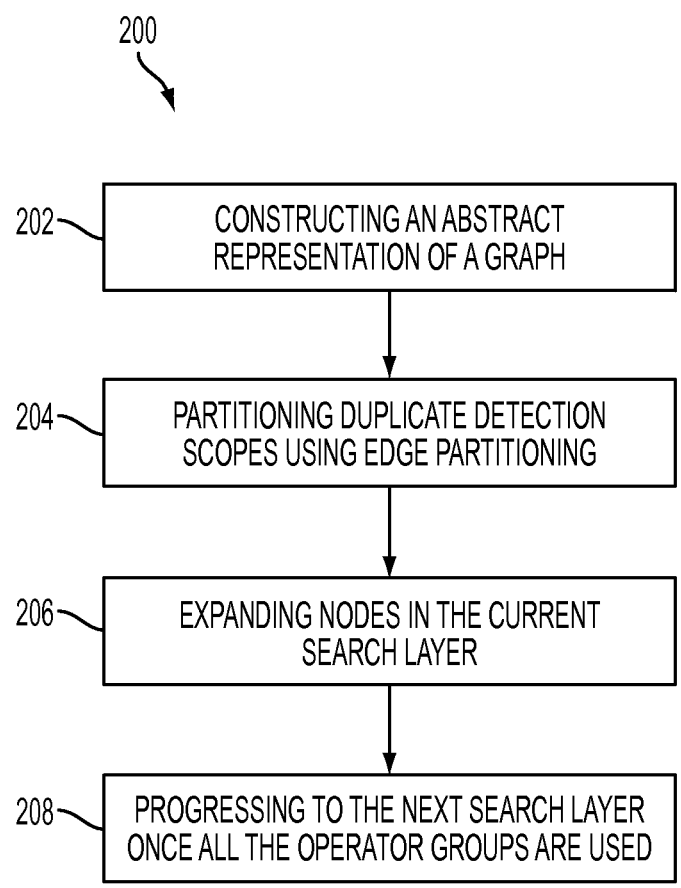
FIG. 2 illustrates a block diagram of the basic actions for obtaining a final search output using parallel edge partitioning.

Turning to FIG. 2, illustrated is a block diagram 200 of actions for obtaining a final search output using Parallel Edge Partitioning (PEP) in an OR graph situation. The diagram 200 includes constructing an abstract representation of the graph (Action 202), partitioning the duplicate detection scopes of abstract nodes (action 204), expanding nodes in the current search layer (Action 206), and progressing to the next search layer once all operator groups are used (Action 208).

Although the diagram 200 in FIG. 2 is illustrated and described below as a series of acts or events, the present disclosure is not limited by the illustrated ordering of such acts or events. For example, some acts may occur repeatedly and/or in different orders and/or concurrently with other acts or events apart from those illustrated and/or described herein, and not all illustrated steps may be required to implement a methodology in accordance with the present disclosure.

An abstract representation of the graph is constructed using state-space abstraction (Action 202). As is known this is generally constructed through the application of a state-space projection function to the graph, where a state-space projection function is a many-to-one mapping from the original state-space to an abstract state-space. Once the abstract representation of the graph is constructed, each abstract node thereof has a duplicate detection scope. Further, each abstract edge includes an operator group.

Using edge partitioning, the duplicate detection scopes of the abstract nodes are partitioned into smaller duplicate detection scopes (Action 204). Each of the smaller duplicate detection scopes corresponds to one of the abstract edges. Advantageously, these smaller duplicate-detection scopes allow parallel searching of the graph even when the graph has no intrinsic locality.

The nodes in the current search layer are expanded (Action 206). Expansion of the nodes is accomplished through the use of the operator groups belonging to the abstract nodes to which the nodes in the current search layer map. Nodes are expanded using these operator groups until all the operator groups are used. So long as only operator groups associated with disjoint duplicate detection scopes are used at any one time, the nodes can be expanded in parallel. As should be appreciated, while the graph is searched, the set of operator groups having disjoint duplicate detection scopes varies.

Once all the operator groups for the current search layer have been used, the search proceeds to the next search layer and the foregoing action repeats (Action 208). Naturally, the above described actions, including this action, repeat until a terminate condition (e.g., a goal node) is reached. Thus, it is to be appreciated that there is not necessarily a temporal relationship between the foregoing actions. Rather, they take place concurrently and may repeat numerous times.

Figure 3:
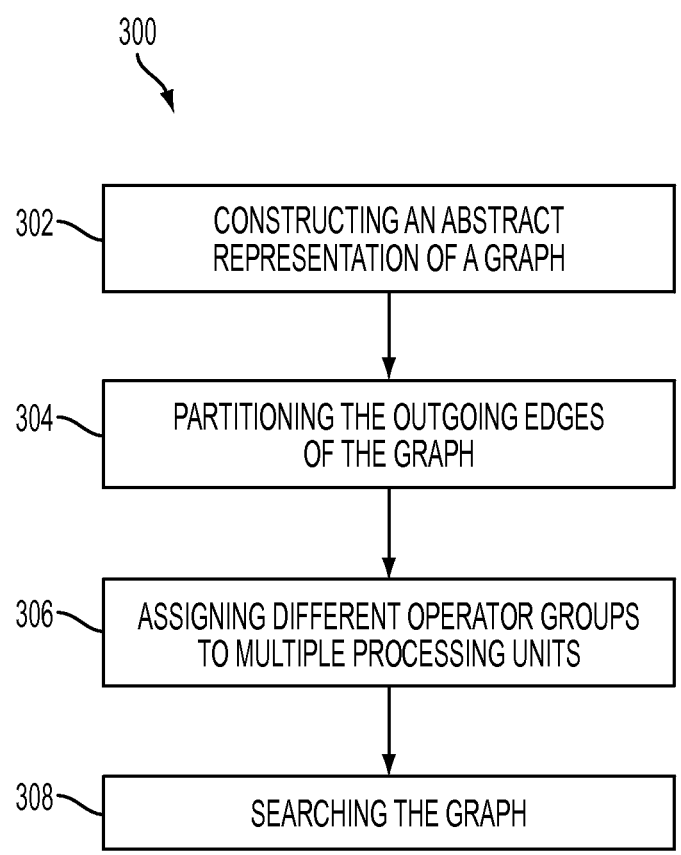
FIG. 3 illustrates an alternative block diagram of the basic actions for obtaining a final search output using parallel edge partitioning.

With reference to FIG. 3, a block diagram 300 of actions for obtaining a final search output using parallel edge partitioning is illustrated. The diagram includes constructing an abstract representation of the graph (Action 302), partitioning the duplicate detection scopes of abstract nodes (action 304), expanding nodes in the current search layer (Action 306), and progressing to the next search layer once all operator groups are used (Action 308).

Although the diagram in FIG. 3 is illustrated and described below as a series of acts or events, the present disclosure is not limited by the illustrated ordering of such acts or events. For example, some acts may occur repeatedly and/or in different orders and/or concurrently with other acts or events apart from those illustrated and/or described herein, and not all illustrated steps may be required to implement a methodology in accordance with the present disclosure.

An abstract representation of the graph is constructed using state-space abstraction (Action 302). As discussed in detail above, this is generally constructed through the application of a state-space projection function to the graph, where a state-space projection function is a many-to-one mapping from the original state-space to an abstract state-space. Once constructed, each abstract node of the abstract representation of the graph has a duplicate detection scope.

The outgoing edges of the graph are partitioned based on the abstract representation of the graph (Action 304). The partitioning includes grouping edges that map to a same abstract edge of the abstract representation together as an operator group. Advantageously, these operator groups allow parallel searching of the graph even when the graph has no intrinsic locality. As should be appreciated, Action 304 is very similar to Action 204 of FIG. 2.

Different operator groups (i.e., operator groups having disjoint duplicate detections scopes) are assigned to processing units until a termination condition is met (Action 306). The processing units use these different duplicate detection scopes to generate successor nodes in parallel, and, as should be appreciated, this Action is similar to Action 206 of FIG. 2, whereby attention is directed thereto.

As successor nodes are generated the graph is searched (Action 308). For example, each node in the current search layer may be tested to determine whether it meets the search criteria.

Similar to FIG. 2, the above described actions repeat until a terminate condition (e.g., an end node) is reached. Thus, it is to be appreciated that there is not necessarily a temporal relationship between the foregoing actions. Rather, they take place concurrently and may repeat numerous times.

In connection with edge partitioning it is understood the duplicate detection scope of an abstract node is no longer understood to be the set of all successor abstract nodes in an abstract graph; instead, it is defined as the single successor abstract node along a particular outgoing edge in the abstract graph. This reflects the fact that, with edge partitioning, the nodes mapping to an abstract node are expanded incrementally. At each stage, an operator group corresponding to a different abstract edge is applied; all operators of the operator group are applied to every node mapping to the abstract node before any other operator groups are considered. At the next stage, a different outgoing abstract edge is considered and a different operator group is applied to the same set of nodes. Eventually, all operator groups are applied to the set of nodes mapped to the same abstract node and the nodes become fully expanded. Note that full expansion of a node requires a sequence of incremental expansions.

An issue with a fully connected abstract graph is that any duplicate-detection scope would consume the entire graph, which precludes the existence of disjoint scopes. But with edge partitioning, any duplicate-detection scope contains only a single bucket of nodes, while still guaranteeing that no synchronization is necessary when expanding nodes that map to the source bucket of the abstract edge. Note that multiple search processes can expand nodes in the same source bucket, as long as the successors that can be generated all map to different buckets other than the source bucket.

So Parallel Edge Partitioning builds on the concepts of state-space abstraction and edge partitioning to extract locality for purposes of parallel graph searching. The idea of parallel edge partitioning (PEP) follows from the recognition that reducing the duplicate detection scope also reduces the degree of contention between concurrent search processes. This has the effect of increasing the degree of concurrency that is allowed in parallel search.

As described above existing PEP techniques are applicable only to OR graphs. Now we describe how PEP can be extended to searching AND/OR graphs.

A first extension of the existing PEP, relates to the understanding that in deterministic planning, a source state and an action uniquely identify the successor state. Thus Parallel Edge Partitioning only considers those successor states when dividing up the duplicate detection scope for OR graphs. However, the same approach becomes insufficient for AND/OR graphs, because the same action applied to the same state can lead to different outcomes. Therefore, an abstract edge for an AND/OR graph needs to consider different outcomes, and the same applies to operator groups, which must use a finer grained grouping of operators based on their outcomes. Therefore PEP-AO* considers the source state, the action and furthermore the resulting outcome.

Figure 4:
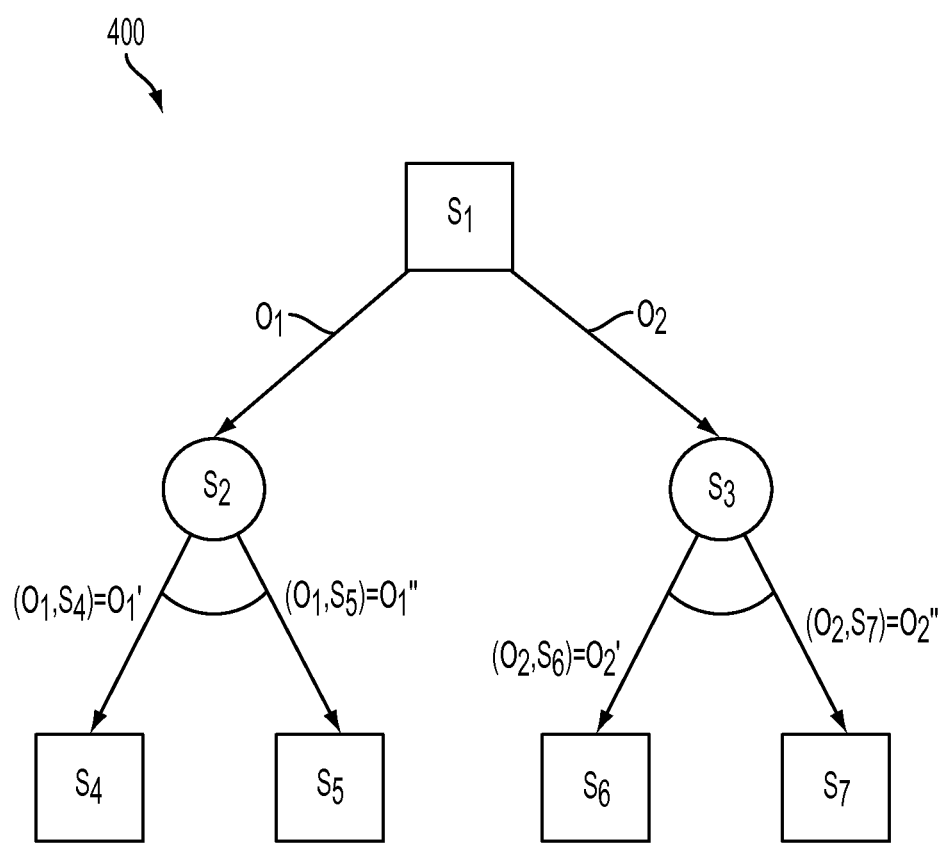
FIG. 4 is an example AND/OR graph showing outcome-adjusted operators.

Turning to FIG. 4, this concept for PEP-AO* is shown in connection with an AND/OR graph 400 (AND nodes are represented as circles and the OR nodes are represented as squares). To avoid confusion, the finer grained operator group for AND/OR graphs is called herein "outcome-adjusted operator group". So in FIG. 4, $S_1$, the initial state takes one of two possible actions, $O_1$ or $O_2$. $S_2$ is the state resulting from $O_1$, but it is transitory in that external effects result in one of two possible outcomes $S_4$ or $S_5$. $S_4$ and $S_5$ represent the states from which a further action may be taken. The action operator $O_1$ has two possible outcomes based on the destination state. $O_1$ leading to state $S_4$ and $O_1$ leading to $S_5$ are differentiated. The outcome adjusted operators $O_1'$ and $O_1''$ reflect this change and are included in an outcome-adjusted operator grouping as outcome adjusted operators. This is a finer grained grouping of operators than PEP. The abstract groups of PEP operator groups are modified in PEP-AO* to include these changes as the outcome-adjusted operator groups. The operators of such outcome-adjusted operator groups share the following properties:

1. They are all applicable to nodes that map to the source of the abstract edge;

2. There exists at least one outcome such that the successor node resulting from applying these operators map to the same abstract state that is the destination of the abstract edge.

Operators in an outcome-adjusted operator group are annotated with the set of outcomes leading to the destination abstract state. When PEP-AO* performs node expansion, only those outcomes that are associated with the operator for a particular abstract state are considered to generate OR successors of an AND search node.

A second extension of PEP is that multiple successor OR nodes of the same AND node are "chained" together to implement k-connector semantics, necessary for the state abstraction. In this example states $S_4$ and $S_5$ are chained together, and states $S_6$ and $S_7$ are chained together. Chaining is implemented in a data structure such as a linked list. If the chaining is done by a dedicated process, this can become a bottleneck of the parallel search because such an operation requires the suspension of potentially all the other processes to avoid data corruption. To avoid this, the chaining operation is divided into incremental chaining operations performed after an outcome-adjusted operator group is used and before the next group is assigned to a worker process. Piggybacking the chaining operation on top of operator assignment doesn't increase the number of times the abstract graph needs to be locked, which is proportional to the size of the abstract graph and the depth of search. Operator group assignment is a necessary operation for PEP regardless of the type of the underlying search graph.

Figure 5A:
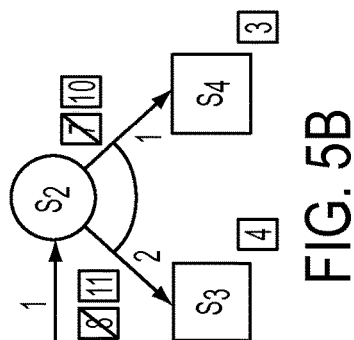
FIGS. 5A-5D shows an expansion of an example AND/OR graph showing f-costs.

With reference to FIGS. 5A-5D a third extension of PEP is illustrated, where an AND/OR graph is expanded and the updates of f-costs are shown. More particularly, FIG. 5A shows a state $S_1$ and a successor state $S_2$ with associated costs. There is an edge or operator cost, and a node cost. The node cost is the f-cost and ancestors are updated to reflect the f-costs of successors as they become known. $S_2$ has an estimated f-cost of 7 and an operator cost of 1 for a total f-cost of 8. Because $S_2$ is the only node of $S_1$, the $S_1$ cost is updated to reflect the total cost known of 8. Admissible f-costs are never overestimated.

Figure 5B:
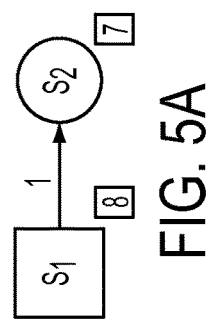

FIG. 5B shows an expansion at the first level and includes an AND node. The operator cost from $S_2$ to $S_3$ is 2 and the estimate for $S_3$ is 4 for a total cost of 6. The operator cost from $S_2$ to $S_4$ is 1 and the estimate for $S_4$ is 3 for a total cost of 4. For illustration purposes, let's assume that AND costs are accumulated for all AND node successors. The new total cost for $S_2$ successors is 10. The previous cost of 7 for $S_2$ is revised based on the expansion to be 10.

Figure 5C:
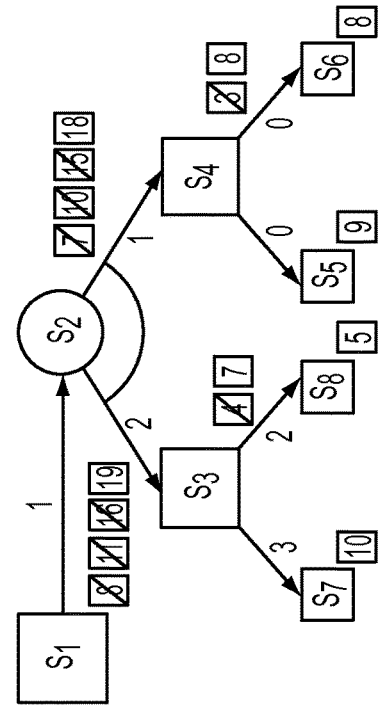

With reference to FIG. 5C, $S_4$ is expanded to nodes $S_5$ and $S_6$. A zero operator cost is associated with both states. $S_5$ has a cost of 9 and $S_6$ has a cost of 8. $S_5$ and $S_6$ are OR nodes or alternatives and therefore the lowest cost is used. $S_4$ is revised to the lowest of its successor states including operator costs to reflect a new f-cost of 8. This must be recursively followed back in the graph. The f-cost of $S_4$ was increased from 3 to 8, and therefore $S_2$ and $S_1$ are also updated to reflect this new cost. F-cost for $S_2$ is now 15, and for $S_1$, the f-cost is now 16.

Figure 5D:
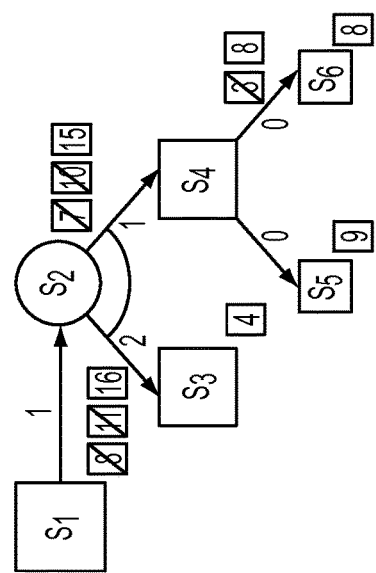

With reference to FIG. 5D, OR node $S_3$ is expanded. $S_7$ has a cost of 10 and an operator cost of 3 for a total cost of 13. $S_8$ has a cost of 5 and an operator cost of 2 for a total cost of 7. This is greater than the estimate of 4 for $S_3$. $S_3$ is revised to the minimum of the two node expansions (10+3) or (5+2) which is 7. The f-cost for $S_1$ is recursively revised to 19.

Similar to the chaining of successors to an AND node, the f-cost update represents a potential bottleneck. A similar piggyback strategy is used where f-cost updates are combined with the assignment of a new operator group. PEP-AO* keeps track of which successors have their f-costs backed up to their ancestors or parents, and only refreshes the ancestor f-cost if a successor has an updated f-cost that has not been propagated to the ancestor. The operation applying the backed-up or pending f-cost updates is aware of the state-space abstraction such that a processor does not update the f-cost of ancestors that are outside of duplicate detection scope.

Figure 6:
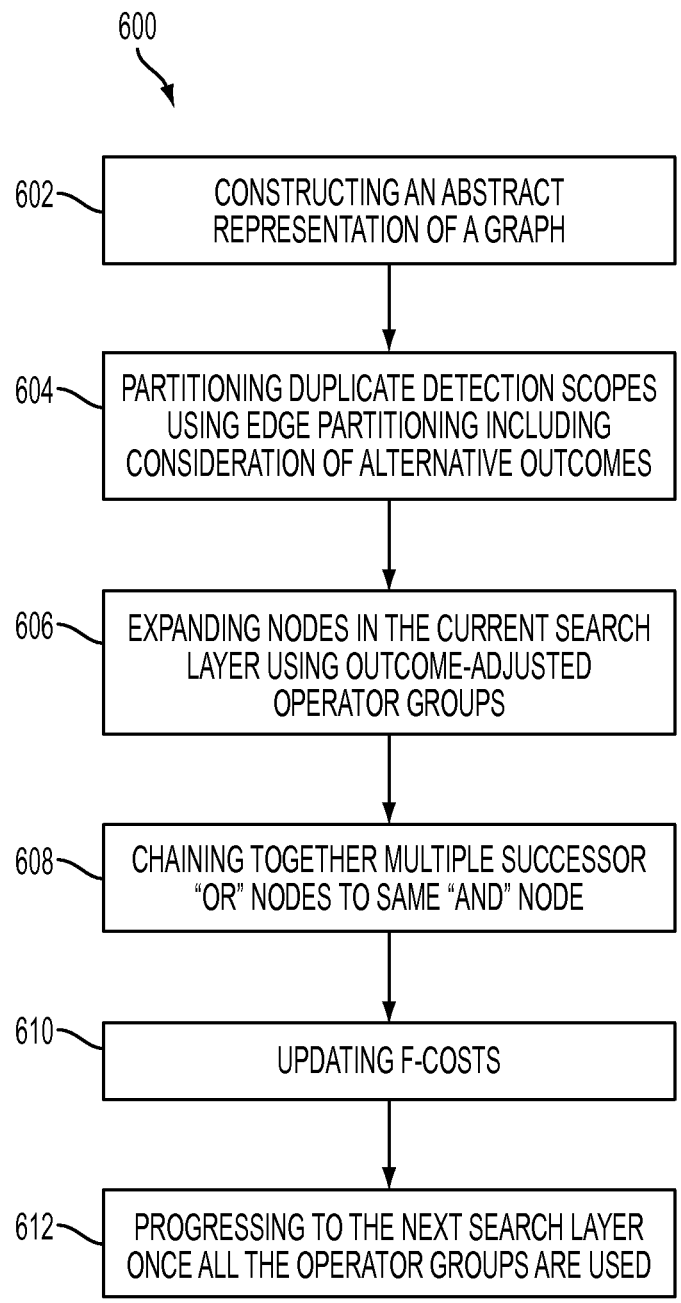
FIG. 6 is a flow diagram of the steps in PEP-AO*.

Turning to FIG. 6, illustrated is a block diagram 600 of actions for obtaining a final search output in an AND/OR graph by extending PEP to PEP-AO* as discussed above. The diagram 600 includes constructing an abstract representation of the graph (Action 602), partitioning the duplicate detection scopes of abstract nodes using edge partitioning and including consideration of multiple potential outcomes (action 604), expanding nodes in the current search layer using outcome-adjusted operator groups (Action 606), chaining together any multiple successor OR nodes to some AND node when an outcome-adjusted operator group has been completed before a next outcome-adjusted operator group is assigned (Action 608), updating f-cost and ancestors to reflect the f-costs of successors as they become known (Action 610) and progressing to the next search layer once all operator groups are used (Action 612). It is understood that whereas FIG. 6 illustrates the steps employed to extend PEP into PEP-AO*, these same extensions would be added to the steps of FIG. 3. Although the diagram 600 in FIG. 6 is illustrated and described above as a series of acts or events, the present disclosure is not limited by the illustrated ordering of such acts or events. For example, some acts may occur repeatedly and/or in different orders and/or concurrently with other acts or events apart from those illustrated and/or described herein, and not all illustrated steps may be required to implement a methodology in accordance with the present disclosure.

Figure 7:
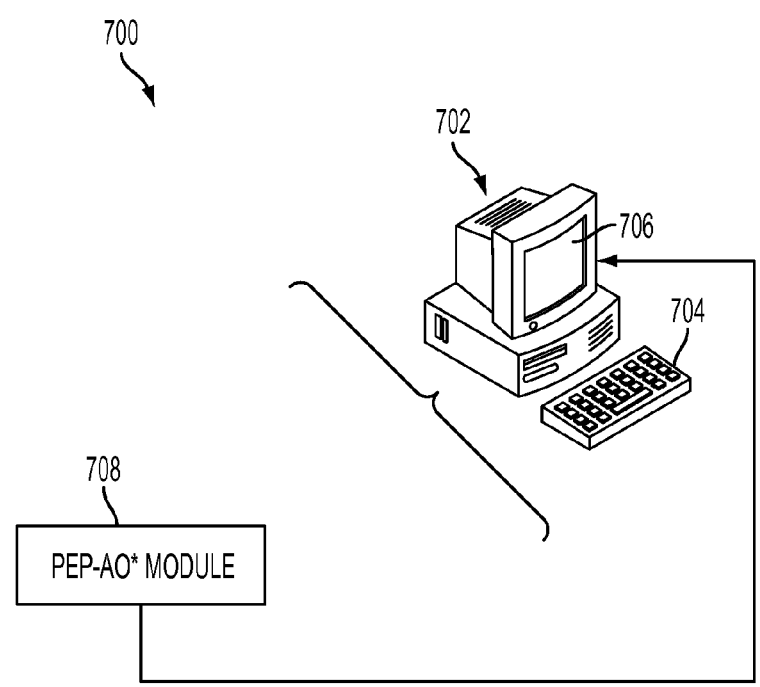
FIG. 7 illustrates a system suitably embodying PEP-AO*.

Turning now to FIG. 7 a PEP-AO* system 700 is illustrated in which PEP-AO* operations may take place. Suitably, a computer 702 or other digital/electronic processing/computing device or devices, including storage and a digital processor, such as a microprocessor, microcontroller, graphic processing unit (GPU), having single and/or multiple cores, etc., embody the system 700. In other embodiments, the system 700 is embodied by a server including a digital processor and including or having access to digital data storage, such server being suitably accessed via the Internet or a local area network, or by a handheld communication device which includes a digital processor section and digital data storage, or so forth.

The computer 702 or other digital processing device suitably includes or is operatively connected with one or more user input devices such as an illustrated keyboard 704 for receiving user input to control the system 700, and further includes or is operatively connected with one or more display devices such as an illustrated display 706 for displaying output generated based on the output of the system 700. In other embodiments, the input for controlling the system 700 is received from another program running previously to or concurrently with the system 700 on the computer 702, or from a network connection, or so forth. Similarly, in other embodiments the output may serve as input to another program running subsequent to or concurrently with the system 700 on the computer, or may be transmitted via a network connection, or so forth.

The system 700 includes a PEP-AO* module 708 that carries out PEP-AO* operations according to the present application. Suitably, the PEP-AO* 708 receives a graph (represented either explicitly or implicitly) from a source external to the PEP-AO* module 708 and performs PEP-AO* thereon. The external source may, for example, be a file stored on the computer 702 or a user of the computer 702, where the user interacts with the PEP-AO* module 708 via the keyboard 704.

In some embodiments, the PEP-AO* module 708 is embodied by a storage medium storing instructions executable (for example, by a digital processor) to implement the parallel edge partitioning. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 8:
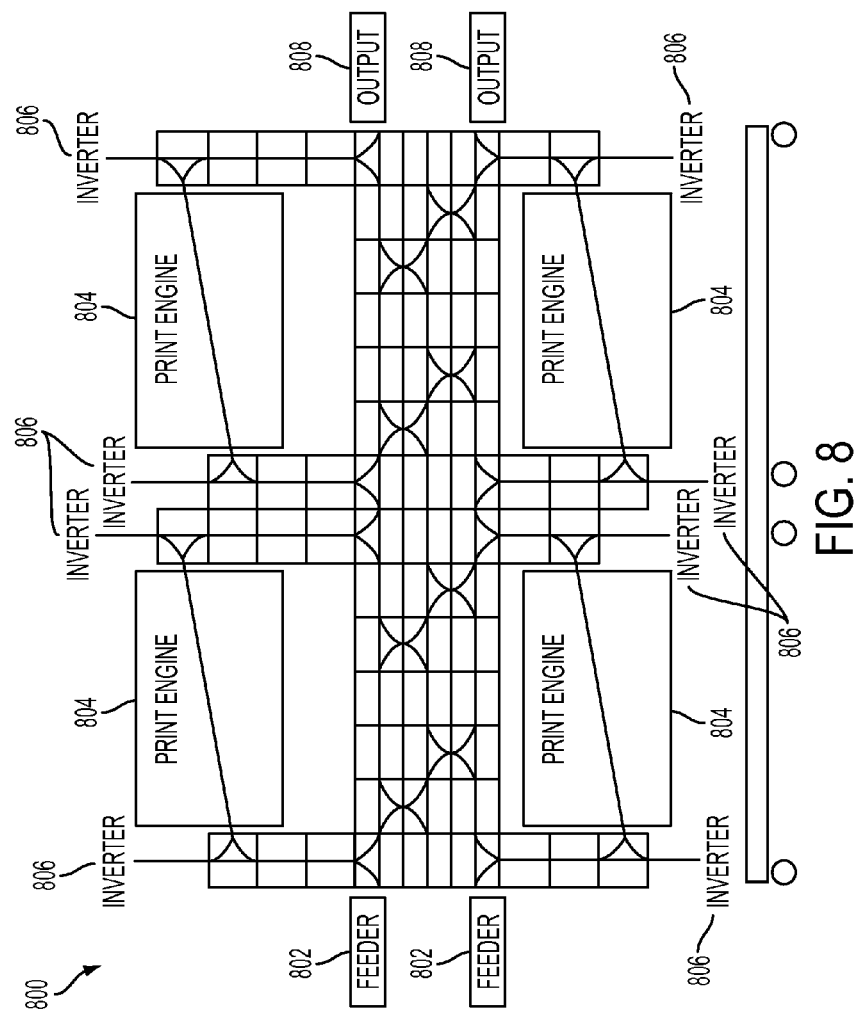
FIG. 8 illustrates a simplified side elevation view of an exemplary modular redundant printing engine in which a parallel edge partitioning finds particular application.

Turning to FIG. 8, a modular redundant printing system 800 is illustrated exemplifying one practical application of the PEP-AO* system of FIG. 7 is discussed above. The system 800 includes 197 independent modules including feeders 802, marking (print) engines 804, redirectors or inverters 806, finishers, and output trays 808, etc. The modules work together to produce a variety of printed products.

PEP-AO* can be used in planning the distribution of print jobs across the print engines 804. For example, PEP-AO* can be used to find the shortest path from a feeder 802 to an output tray 808 taking into account that certain print engines 804 may be indisposed. In another example, PEP-AO* can be used to schedule print jobs so as to minimize delay. To map the planning problem to a graph, system states are treated as nodes of a graph and relations between system states are treated as edges of the graph. Edge weights may, but need not be, time, distance, cost, or the like. A plan then comprises an arrangement of system states.

Notwithstanding that the PEP-AO* system 700 of FIG. 7 is suitably employed within a print system, it is to be appreciated that the PEP-AO* system may suitably be employed within other systems using graph searching. For example, the PEP-AO* system 700 of FIG. 7 may alternatively be employed within route planning systems and/or methods. That is to say, PEP-AO* may alternatively be employed to find the shortest or fastest path between two locations.

With reference to FIG. 9, tests were performed using BPM sample problems. The BPM problem domain is called Status and Action Management, and shows how status variables of business objects change their values when IT-level transactions affecting the business objects are executed. These were originally intended to provide a declarative way of checking transaction preconditions. Using the Status and Action Management domain, processes are generated which are based on high-level business object goals. FIG. 9 shows the results produced by AO* in solving different BPM type problems.

With reference to FIG. 10, tests were performed using the same problem sets and PAO* or parallel AO*. Threads represent the number of processors which operate in parallel to improve the time to solve the problem. Parallelism does not improve the results due to the extra search overhead in expanding nodes that are not necessarily expanded by sequential AO*. Load balancing may be an issue because the required search depth beneath the parallelization frontier is unknown at the time each sub-problem is assigned to a worker process. Ineffective load balancing is where a worker process is without work while other worker processes are overloaded. Extra node expansion of PAO* with one problem set caused processes to run out of memory.

With reference to FIG. 11, the same tests were performed using PEP-AO* with different numbers of threads or processors in parallel. PEP-AO* was simplified by deemphasizing duplicate detection, which is not critical for the BPM problems tested. The results show improvement in elapsed time as the number of threads is increased in each of the problem sets.

Figure 12:
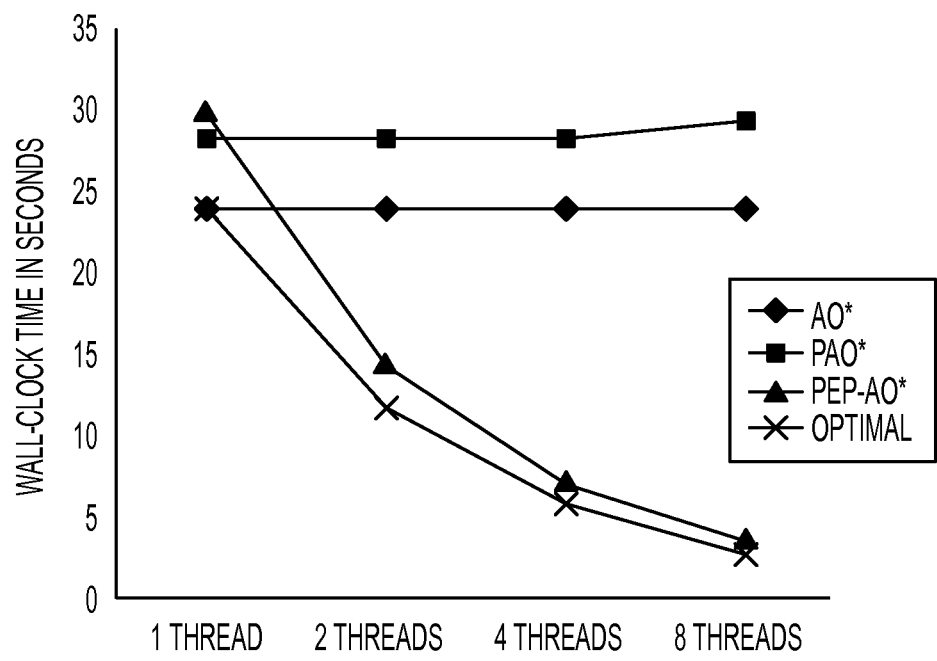
FIG. 12 shows a graph comparing the results of the various techniques for solving BPM problems.

With reference to FIG. 12, the results of all the tests for problem p-137 are plotted against each other and a theoretically optimal parallel algorithm. The theoretically optimal algorithm achieves a perfect speedup. Problem p-137 is chosen because it represents the average performance on the five problems tested. The overhead of PEP-AO* is represented in the difference between the performance of PEP-AO* with one thread and the performance of AO*. As more threads are added, PEP-AO* approaches the theoretical maximum asymptotically. PEP-AO* has unique memory access patterns which can be observed using memory monitoring utilities. The memory working set for PEP-AO* is often among the smallest among parallel graph search algorithms. PEP-AO* can localize memory reference during parallel search even if the search problem is known to have almost no locality. The approach of using memory and processors can be modified to use disk as supplemental storage.

Planning in non-deterministic environments arises in many real-world applications, including business process management (BPM) in which executing the same action can lead to various outcomes beyond the control of the planner. To synthesize a robust plan that works under different circumstances, the planner must find a contingency plan that takes different actions based on different execution outcomes. But finding a good contingency plan can be computationally expensive, because keeping track of all possible action outcomes can quickly lead to a combinatorial explosion of the search space. The present disclosure has described an efficient parallelization scheme for non-deterministic planning formalized as AND/OR graph search. Experiments on BPM problems from SAP show the new approach achieves a linear speedup in the number of processor cores, significantly reducing planning time while the amount of memory used remains the same.

Note that the parallelization techniques described in this disclosure are effective for finding both strong and weak plans.

In the foregoing AND nodes are used to represent possible contingencies or outcomes of an action represented as an edge from an OR node to an AND node. The AND node outgoing edges represent possible outcomes to be evaluated.

One aspect of PEP-AO* is that PEP-AO* avoids by abstraction determining the right size and right search nodes for the parallelization frontier.

Another aspect is that PEP-AO* reduces the overhead of parallel search by avoiding the expansion of sub-optimal search nodes, because the sub-problems extracted out of the parallelization frontier may not need to be solved exactly at each worker process, if one is clearly dominated by another.

Another aspect is that PEP-AO* does not expand nodes significantly more than the sequential AO* algorithm.

Another aspect is that PEP-AO* can detect duplicates as soon as they are generated, which can improve search efficiency dramatically for highly coupled graph search problems.

Another aspect is that PEP-AO* minimizes inter-worker communications.

Another aspect is that PEP-AO* localizes memory references.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A printing system, comprising:
a plurality of feeders;
a plurality of print engines;
a plurality of output trays;
memory; and
one or more electronic processing devices programmed to:
construct from an AND/OR graph in an original state space, an abstract representation of the AND/OR graph in an abstract state space, by use of state-space abstraction, which includes a many-to-one mapping process;
partition duplicate detection scopes by edge partitioning including consideration of alternative outcomes;
expand nodes in a current search layer using outcome adjusted operator groups;
chain together multiple successor OR nodes to a same AND node;
update f-costs, wherein the updating of f-costs includes updating f-costs on ancestor nodes to reflect f-costs of successor nodes, and wherein the f-costs include an edge cost or operator cost and a node cost;
progress to a next search layer once all the outcome adjusted operator groups of a present search layer are used;
repeat at least some of the foregoing steps until a termination condition is reached, and
finding a shortest path from a feeder of the plurality of feeders to an output tray of the plurality of output trays by:
treating the nodes as printing system states, and
treating edges of the AND/OR graph as relations between printing system states;
wherein the printing system is configured to output a print job on the found shortest path from the feeder of the plurality of feeders to the output tray of the plurality of output trays.

2. The printing system according to claim 1 wherein operators of the outcome adjusted operator groups are all applicable to nodes that map to a source of an abstract edge.

3. The printing system according to claim 1 wherein there exists at least one outcome such that a successor node resulting from applying operators, map to a same abstract state that is a destination of an abstract edge.

4. The printing system of claim 1, wherein the searching of the AND/OR graph addresses non-deterministic planning problems.

5. The printing system of claim 1, wherein the searching of the AND/OR graph automatically synthesizes workflows and action sequences in business process management.

6. A method to improve performance of non-deterministic planners, said method comprising:
constructing, from an AND/OR graph in an original state space, an abstract representation of the AND/OR graph in an abstract state space, using state-space abstraction which includes a many-to-one mapping process, wherein the abstract representation of the AND/OR graph includes one or more abstract nodes having duplicate detection scopes and one or more abstract edges having outcome-adjusted operator groups which are operator groups adjusted for AND node outcomes, wherein operators in the outcome-adjusted operator groups are annotated with a set of outcomes leading to a destination abstract state, and wherein the operators of the outcome-adjusted operator groups are all applied to nodes that map to a source of a same abstract edge;

partitioning the duplicate detection scopes of the abstract nodes into smaller duplicate detection scopes using edge partitioning, wherein the abstract edges are used to define the smaller duplicate detection scopes;

expanding nodes in a current search layer using the outcome-adjusted operator groups of outgoing abstract edges of the abstract nodes mapped into by the nodes, wherein the nodes expanded in parallel use the outcome-adjusted operator groups associated with abstract edges having disjoint duplicate detection scopes, and wherein during node expansion, only those outcomes that are associated with the operator for a particular abstract state are considered to generate OR successors of an AND search node; and, progressing to a next search layer once all the outcome-adjusted operator groups in the current search layer have been used for node expansions;

wherein the AND/OR graph is a search graph for a planning problem in which nodes of the AND/OR graph correspond to planning states and edges correspond to transitions between system states, and wherein a source state, an action and resulting outcome are all taken into consideration in the planning problem;

wherein the steps of the method are performed using at least two processors; and wherein the planning problem is parallelized on the at least two processors.

7. The method of claim 6, wherein the abstract nodes are comprised of OR and AND nodes of the AND/OR graph, wherein the OR nodes of the AND/OR graph and the AND nodes with successor nodes chained together map to the abstract nodes under a state-space projection function.

8. The method of claim 7, wherein a first abstract node of the abstract nodes is a successor of a second abstract node of the abstract nodes if a first node of the AND/OR graph is a successor of a second node of the AND/OR graph which is an OR node, the first node maps to the first abstract node under the state-space projection function, and the second node maps to the second abstract node under the state-space projection function; and wherein a first abstract node of the abstract nodes is a successor of a second abstract node of the abstract nodes if a first node of the AND/OR graph is a successor of a second node of the AND/OR graph which is an AND node, and the first node is chained to all successors of the second node, the first node and nodes chained to the first node map to the first abstract node under the state-space projection function, and the second node maps to the second abstract node under the state-space projection function.

9. The method of claim 6, wherein the duplicate-detection scope for an abstract edge is comprised of nodes and of the AND/OR graph mapping to a destination of the abstract edge, and the immediate successors of any AND nodes are grouped.

10. The method of claim 6, wherein the edge partitioning includes using an operator-grouping procedure to divide a set of applicable operators $O_y$ for an abstract node y into operator groups, one for each successor of y, wherein an operator group $O_{y,y'}$ is a subset of the applicable operators $O_y$ that consists of all operators and operators adjusted for AND outcomes that are associated with the abstract edge (y, y').

11. The method of claim 6, wherein the expanding includes generating successor nodes through incremental node expansion.

12. The method of claim 6, wherein an OR node represents a choice of actions, and an AND represents a non-deterministic state and the successor nodes to the AND node represent possible outcomes.

13. The method of claim 12, wherein the AND/OR graph represents business plans and possible contingencies.

14. The method of claim 6, wherein the at least two processors comprises at least four processors.

15. The method of claim 6, wherein:
the AND/OR graph represents business plans and possible contingencies;
an OR node represents a choice of actions; and
an AND represents a non-deterministic state and the successor nodes to the AND node represent possible outcomes.

16. A printing system, comprising:
a plurality of feeders;
a plurality of print engines;
memory; and
one or more electronic processing devices programmed to:
construct from an AND/OR graph an abstract representation of the AND/OR graph in an original state space, using state-space abstraction which includes a many-to-one mapping process, wherein the abstract representation of the AND/OR graph includes one or more abstract nodes having duplicate detection scopes and one or more abstract edges having outcome-adjusted operator groups which are operator groups adjusted for AND node outcomes, wherein operators in the outcome-adjusted operator groups are annotated with a set of outcomes leading to a destination abstract state, and wherein the operators of the outcome-adjusted operator groups are all applied to nodes that map to a source of a same abstract edge;
partition the duplicate detection scopes of the abstract nodes into smaller duplicate detection scopes using edge partitioning, wherein the abstract edges are used to define the smaller duplicate detection scopes;
expand nodes in a current search layer using the outcome-adjusted operator groups of outgoing abstract edges of the abstract nodes mapped into by the abstract nodes, wherein the abstract nodes expanded in parallel use the out-come adjusted operator groups associated with abstract edges having disjoint duplicate detection scopes, and wherein during node expansion, only those outcomes that are associated with the operator for a particular abstract state are considered to generate OR successors of an AND search node;
progress to a next search layer once all the outcome-adjusted operator groups in the current search layer have been used for node expansion; and
schedule print jobs so as to minimize delay by mapping a planning problem to the AND/OR graph by:
treating the nodes as printing system states, and
treating the abstract edges of the AND/OR graph as relations between printing system states.

17. The printing system of claim 16, wherein the edge partitioning includes using an operator-grouping procedure to divide a set of applicable operator and outcome adjusted operators $O_y$ for an abstract node y into operator groups, one for each successor of y, wherein an operator group $O_{y,y'}$ is a subset of the applicable operators $O_y$ that consists of all operators that are associated with the abstract edge (y, y').

18. The printing system of claim 16, further comprising a plurality of output trays configured to receive the print jobs that were scheduled so as to minimize delay.

19. A method to improve performance of non-deterministic planners, comprising:
constructing from an AND/OR graph in an original state space an abstract representation of the AND/OR graph in an original state space using state-space abstraction including a many-to-one mapping process, wherein the abstract representation of the AND/OR graph includes one or more abstract nodes having duplicate detection scopes and one or more abstract edges;
partitioning the outgoing edges of the AND/OR graph based on the abstract representation of the AND/OR graph, the partitioning including grouping edges or outcome adjusted operators that map to a same abstract edge of the abstract representation together as an outcome-adjusted operator group, wherein operators in the outcome-adjusted operator groups are annotated with a set of outcomes leading to a destination abstract state, and wherein the operators of the outcome-adjusted operator group are all applied to nodes that map to a source of a same abstract edge;
assigning different outcome-adjusted operator groups to processing units until a termination condition is met, wherein during the assigning, only those outcomes that are associated with the operator for a particular abstract state are considered to generate OR successors of an AND search node, and wherein the processing units use the outcome-adjusted operator groups to generate successor nodes in parallel; and
searching the AND/OR graph using the abstract representation of the AND/OR graph, wherein the AND/OR graph is a search graph for a planning problem in which nodes of the AND/OR graph correspond to planning states and edges correspond to transitions between system states, and wherein a source state, an action and resulting outcome are all taken into consideration in the planning problem;
wherein the method is performed using at least two processors; and
wherein the planning problem is parallelized on the at least two processors.

* * * * *